United States Patent Office  
3,717,518  
Patented Feb. 20, 1973

3,717,518  
ROCKET PROPELLANT AND METHOD  
Robert D. Fox, Midland, Mich., William A. Rains, Trenton, N.J., and Gerald G. Lambert, Milwaukee, Wis., assignors to the United States of America as represented by the Secretary of the Air Force  
No Drawing. Filed June 25, 1970, Ser. No. 48,784  
Int. Cl. C06d 5/06, 5/10; C101 7/04  
U.S. Cl. 149—36   3 Claims

ABSTRACT OF THE DISCLOSURE

A composition suitable for use in rocket propellants is prepared by dissolving an oxidizer material in an excess of anhydrous liquid hydrazine and gelling the resulting mixture. Critical weight percentage ranges for hydrazine, gelling agent, oxidizer, and metallic fuel particles are given.

BACKGROUND OF THE INVENTION (1) Field of the invention

This invention is in the field of rocket propellants. More particularly, this invention is in the field of rocket propellants utilizing gelled hydrazine as a fuel.

(2) Description of the prior art

It is well known that rocket propellants are formulated from two or more materials selected from the group comprising oxidizers, fuels, chemical compounds combining both fuel and oxidizer properties, additives (e.g., burn rate catalysts), and inhibitors. In the formulation of rocket propellants, those skilled in the art constantly strive to achieve a delicate balance among the materials utilized which will produce a fuel having desirable characteristics and eliminate undesirable characteristics. A few of the desirable characteristics which are important in providing a satisfactory propellant are listed below.

(1) The propellant should produce a high release of energy when burned.

(2) The combustion products of the fuel should be of low molecular weight in order that the value of the specific impulse will be high.

(3) The propellant should be stable for a long period of time and over a wide range of conditions in order that it may be stored.

(4) The propellant should have high physical strength.

(5) The propellant should be easy to handle during fabrication.

The above are only some of the desirable characteristics that a useful rocket propellant should possess. There are many others, each as important in its own right, which could be listed and their achievement plus the elimination of undesirable characteristics is well known to be very difficult to accomplish.

Liquid hydrazine has been known since the early 1940's as a potentially useful rocket propellant fuel because of the high specific impulse which may be obtained from it. However, as a liquid it has proven very difficult and dangerous to handle and more recent research has been directed toward the use of gelled hydrazine. Hydrazine has been gelled with a number of gelling agents and incorporated into propellant compositions as a viscous, solid type material. While this method of incorporation has made the use of hydrazine more practical, problems still remain so that the use of hydrazine has still not reached its full potential. One of the problems associated with gelled hydrazine has resulted from the fact that large amounts of relatively inert, poor burning gelling agents have been necessary in order to accomplish the gellation. This has resulted in fuels which have not come close to realizing the full potential of hydrazine with regard to specific impulse. Therefore, research has continued in the area of new gelling agents and in the field of new formulations in efforts to produce propellants with satisfactory characteristics.

SUMMARY OF THE INVENTION

It has now been found that if hydrazine is incorporated into rocket propellants partially as a gelled material and partially as a hydrazinium salt, the resulting propellant is stable and easily worked with, and produces specific impulses which are relatively high when compared with conventional double base propellants. The propellant formulations disclosed herein consist essentially of 2 to 5 weight percent of gelling agent, 10 to 25 weight percent metallic fuel particles, 30 to 50 weight percent oxidizer, and 30 to 50 weight percent hydrazine with a portion of the hydrazine being present in the form of a hydrazinum salt. If the weight percentages of the various ingredients are varied outside of those specified, the formulations are generally unsuitable for use as rocket propellants because they are either too viscous or not viscous enough. Thus, the object of this invention is to provide rocket propellant formulations based on gelled hydrazine which are safe, easily worked with, and which produce high specific impulses.

The hydrazinium salt is formed by a reaction between the hydrazine and the oxidizer. In order that a portion of unreacted hydrazine may be available to be gelled after the reaction, it is necessary that more than one mole of hydrazine be utilized per mole of oxidizer. For example, it is usually preferred to used from about 0.1 to 0.5 mole of oxidizer per mole of hydrazine.

DESCRIPTION OF THE PREFERRED EMBODIMENT

The preferred embodiment of this invention may be best described by specific examples showing how one particular rocket propellant was prepared and tested and by pointing out preferred, workable weight percentage ranges for the ingredients of the propellants contemplated herein.

EXAMPLE I 82.6 grams of ammonium perchlorate ($NH_4ClO_4$) were slowly added to an excess (120 grams) of anhydrous, liquid hydrazine. The $NH_4ClO_4$ reacted with the hydrazine to form hydrazinium perchlorate ($N_2H_5ClO_4$) and liberate ammonia which escaped from the reaction mixture as a gas. The $N_2H_5ClO_4$ dissolved in the excess liquid hydrazine. Upon completion of the $N_2H_5ClO_-$ formation, 7.78 grams of polyacrylamide gelling agent, a readily available polymer made up of repeated units of the formula:

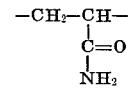

were added to the liquid reaction mixture and stirred in. The mixture was placed in an oven at 80° C. for one hour and then removed and cooled to about room temperature (25° C.). After cooling, the mixture was a gel. The gel was charged to a paste mixer and 50 grams of aluminum flake powder (diameter of particles −2 to 60 microns) was added. The powder and gel were mixed for about 5 minutes at atmospheric pressure after which a vacuum was applied slowly to an absolute pressure of 50 mm. Hg. After about five minutes of mixing under vacuum, the vacum was slowly released and the mixing stopped. The composition of the formulation was 20.4 weight percent Al, 37.4 weight percent $N_2H_5ClO_4$, 39.2 weight percent $H_2N$-$NH_2$, and 3.0 weight percent polyacrylamide gelling agent.

EXAMPLE II

A sample of the pasty propellant formulation of Example I was charged to an end-burning rocket motor case and centrifuged at 870 r.p.m. for 5 minutes. The resulting end-burning propellant grain had a loaded weight of 282.5 grams, a diameter of 3.06 inches, and a length of 1.50 inches. It was static test fired in a vertical test stand and the following ballistic results were obtained:

Average pressure _____ 1041 p.s.i.
Burning rate _____ 1.01 in./sec.
Specific impulse ($F°_{1000}$) _____ 237 sec.

A similar propellant based aluminum powder and $$N_2H_5ClO_4$$

but having no gelled hydrazine yielded a specific impulse of only 221 sec. The Example I formulation, in addition to yielding a higher specific impulse than the conventional propellant, proved to be very easily worked with.

Examples of other gelling agents which may be used include sulfonated polyvinyl benzene, colloidal silica, methyl cellulose, and sodium carboxy methylcellulose. Metallic fuels such as Be powder, Mg powder, and Li powder may be used in lieu of the Al powder of Example I. Other oxidizers such as $NH_4NO_3$ which will react with hydrazine to form hydrazinium salts may be used in lieu of the $NH_4ClO_4$ of Example I with excellent results. The 80° C. temperature specified in Example I may be varied by about ±5° C. with excellent results. The one hour heating time of Example I may be varied by about ±15 minutes.

The viscosity of a propellant formulation of the type disclosed herein may be varied by varying the proportions of the ingredients. It is dependent on the concentration of gelling agent and on solids loading. At low concentrations of gelling agent and solids the formulation is paste-like and can be moved under the application of high shear. As concentartions of gelling agent and solids are increased, the formulation becomes progressively more gummy and elastomeric. Formulations having concentrations of gelling agent outside of about 2 to about 5 weight percent, concentrations of metallic fuel outside of about 10 to about 25 weight percent, concentrations of oxidizer outside of about 30 to about 50 weight percent, and concentrations of hydrazine outside of about 30 to about 50 weight percent are generally difficult to work with and unsuitable for casting into a rocket engine. Thus the above weight percentages are critical in obtaining a satisfactory propellant based upon hydrazine.

We claim:
1. The method of preparing a gel suitable for use as an end-burning rocket propellant grain which comprises
   (a) adding an oxidizer material which reacts with hydrazine to form a hydrazinium salt to an excess of anhydrous hydrazine;
   (b) reacting said oxidizer with said excess of hydrazine, thereby forming a solution of said hydrazinium salt in hydrazine;
   (c) adding to said solution a gelling agent selected from the group consisting of polyacrylamide, sulfonated polyvinyl benzene, colloidal silica, methyl cellulose, and sodium carboxy methyl cellulose;
   (d) heating the solution at a temperature of from about 75° C. to about 85° C. for about 45 minutes to about 75 minutes; and
   (e) cooling said heated solution to about room temperature.

2. The method according to claim 1 in which the oxidizer material is ammonium perchlorate.

3. The method according to claim 1 in which the oxidizer material is ammonium nitrate.

References Cited
UNITED STATES PATENTS

| | | | |
|---|---|---|---|
| 3,197,348 | 7/1965 | Skolnik | 149—36 X |
| 3,230,281 | 1/1966 | Carroz | 149—36 X |
| 3,077,072 | 2/1963 | Rice | 149—36 |
| 2,978,864 | 4/1961 | Stengel | 149—36 X |
| 3,301,721 | 1/1967 | McCoy | 149—2 |
| 3,359,144 | 12/1967 | Atkins et al. | 149—36 |
| 3,116,187 | 12/1963 | Scanlon et al. | 149—36 X |
| 3,232,801 | 2/1966 | Bost et al. | 149—19 |
| 3,492,177 | 1/1970 | Raw et al. | 149—20 |

BENJAMIN R. PADGETT, Primary Examiner

U.S. Cl. X.R.

149—17, 44; 44—7 C